(No Model.) 5 Sheets—Sheet 1.
A. P. HANSCOM.
MACHINE FOR SAWING OFF BARS OR STRIPS OF METAL.
No. 586,847. Patented July 20, 1897.

WITNESSES:
A. D. Hanison
P. W. Pizzatti

INVENTOR:
A. P. Hanscom
by Knight Brown & Quinby
attys.

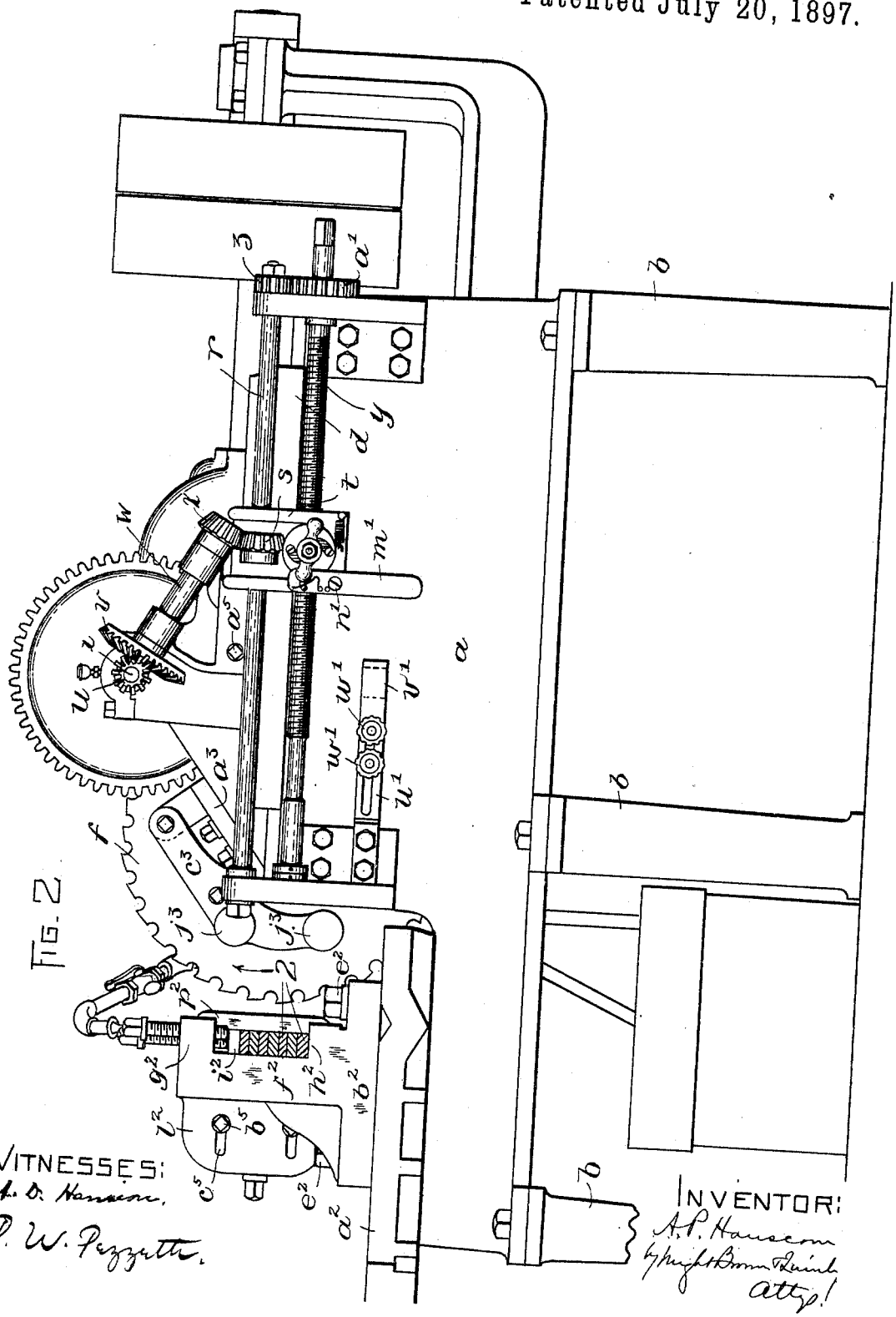

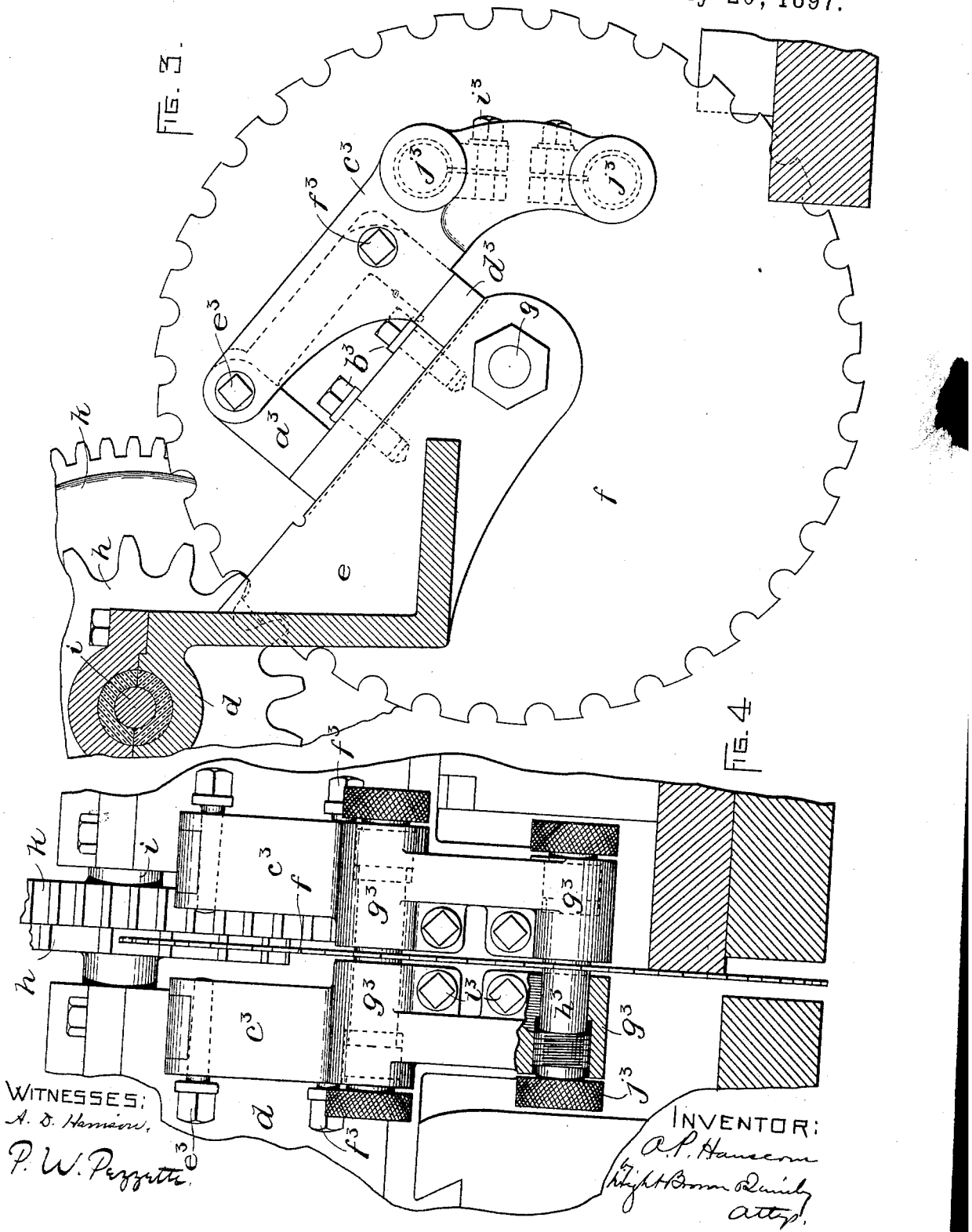

(No Model.)

A. P. HANSCOM.
MACHINE FOR SAWING OFF BARS OR STRIPS OF METAL.

No. 586,847.  Patented July 20, 1897.

5 Sheets—Sheet 4.

WITNESSES:
A. D. Harrison.
P. W. Pezzetti.

INVENTOR:
A. P. Hanscom
by Wright Brown & Quinby
attys.

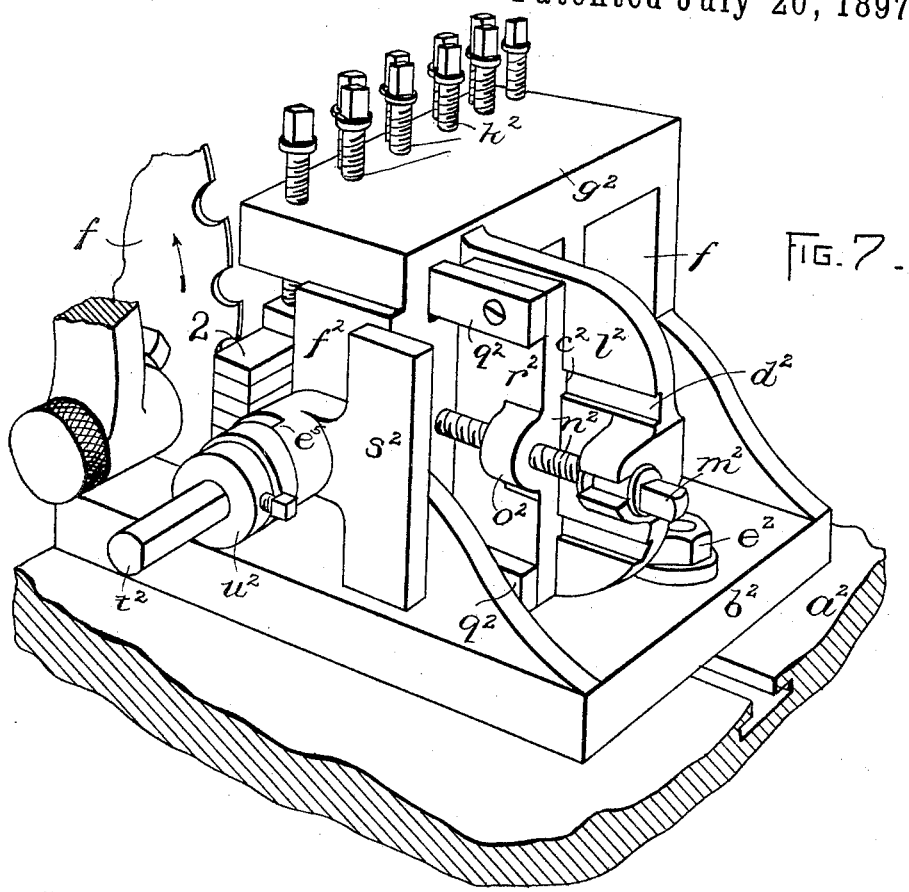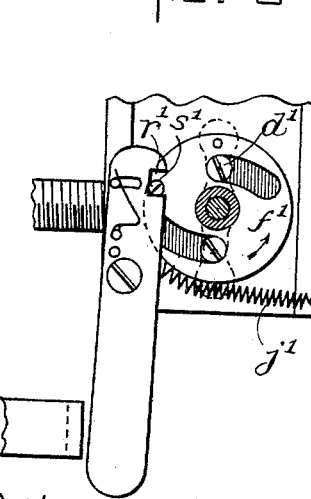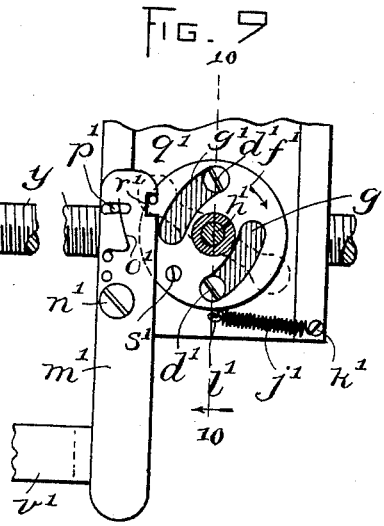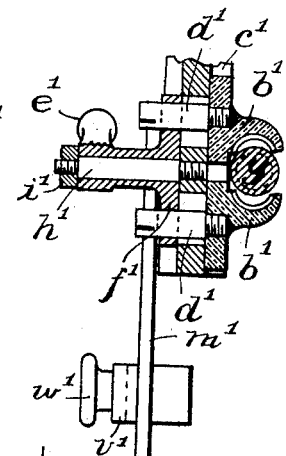

UNITED STATES PATENT OFFICE.

ADELBERT P. HANSCOM, OF MEDFORD, MASSACHUSETTS, ASSIGNOR TO THE Q & C COMPANY, OF PORTLAND, MAINE.

MACHINE FOR SAWING OFF BARS OR STRIPS OF METAL.

SPECIFICATION forming part of Letters Patent No. 586,847, dated July 20, 1897.

Application filed October 17, 1896. Serial No. 609,177. (No model.)

*To all whom it may concern:*

Be it known that I, ADELBERT P. HANSCOM, of West Medford, in the county of Middlesex and State of Massachusetts, have invented certain new and useful Improvements in Machines for Sawing Off Bars or Strips of Metal, of which the following is a specification.

This invention has relation to machines for sawing off bars or strips of hard metal; and it has for its object to produce such a machine which is simple and not liable to get out of order and which will operate with the greatest ease and efficiency.

Another object of my invention is to provide supports or guides to prevent the saw from vibrating laterally and to cause it to make a clean cut through the work and to add such improvements to the work-holder as that the work will be guided to the saw and be held firmly while the cutting action progresses, and, further, to equip the machine with an automatically-acting device for stopping the feed of the carriage when the saw has cut through the work.

To this end my invention consists of a machine embodying those features of construction and arrangement illustrated on the drawings and now to be described in detail, and pointed out in the claims.

Reference is to be had to the annexed drawings, and to the letters and figures marked thereon, forming a part of this specification, the same letters and figures designating the same parts or features, as the case may be, wherever they occur.

Figure 1:
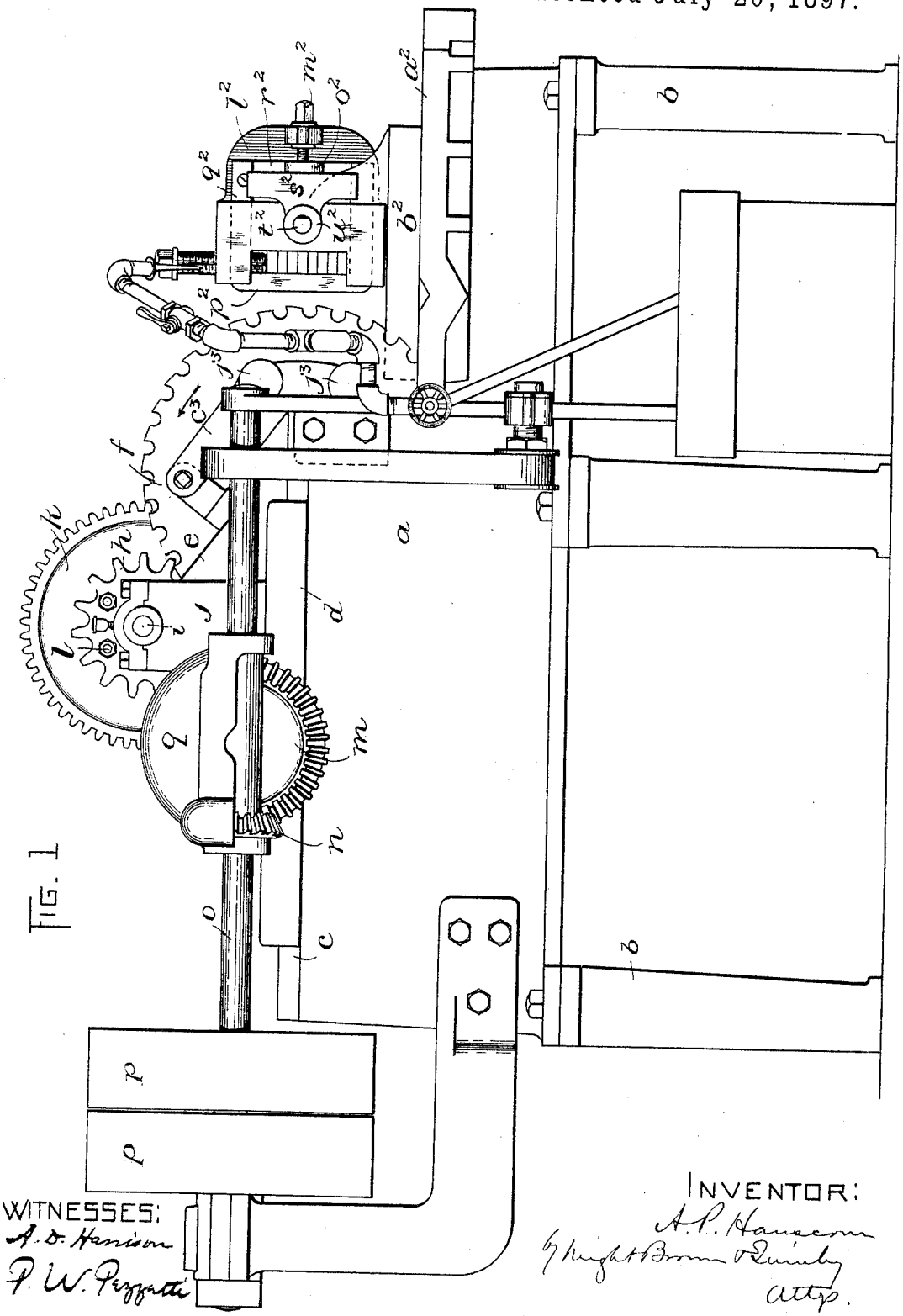
Figure 5:
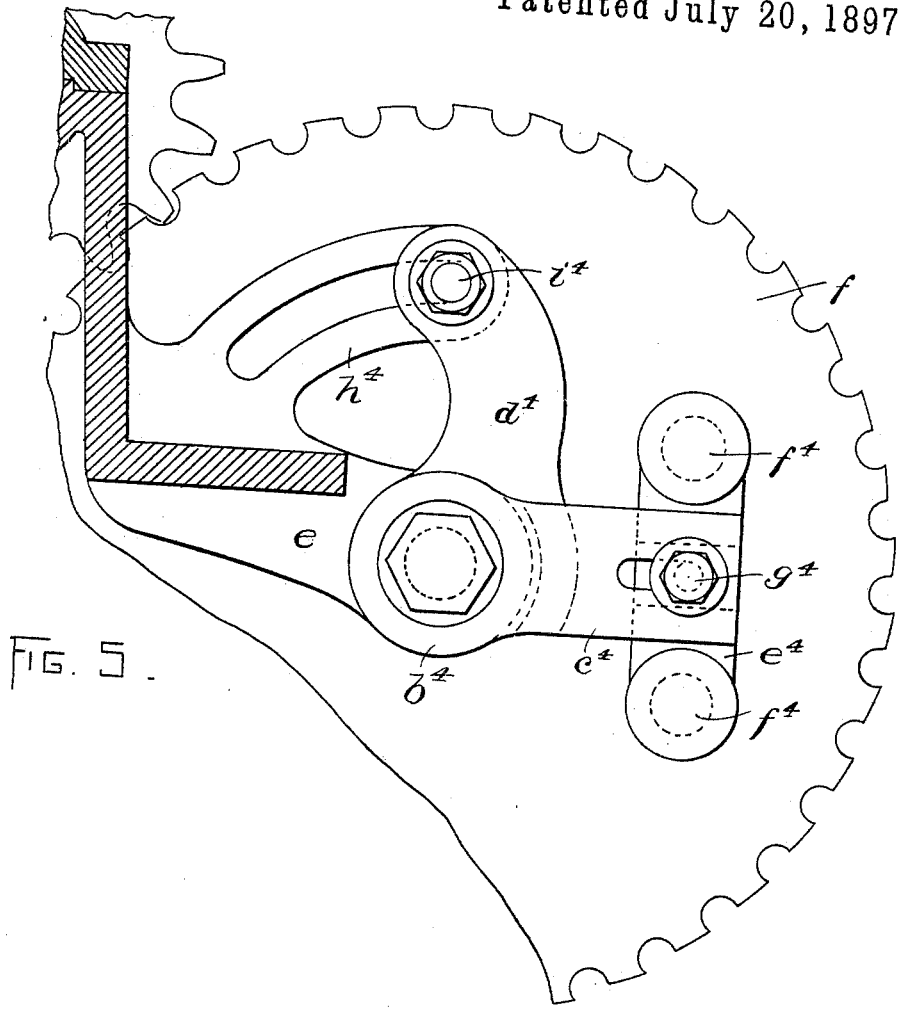
Figure 6:
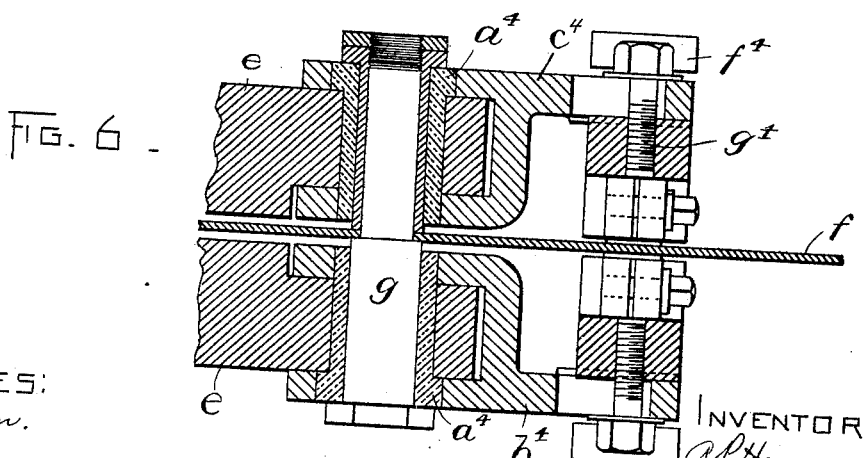

Of the drawings, Figure 1 is a side elevation of my improved machine. Fig. 2 is an elevation looking from the other side. Fig. 3 shows in side elevation, partially in section, the saw for cutting the bars or strips and my improved guides or devices for steadying the saw and preventing it from having any transverse or lateral movement or vibration. Fig. 4 is a front end elevation of the same. Figs. 5 and 6 show other forms of my device or guide for steadying the saw. Fig. 7 is a perspective view of the work-holder and its adjacent parts. Figs. 8, 9, and 10 illustrate the split feed-nut and the devices for freeing it from engagement with its screw to stop the forward movement of the carriage.

The machine is constructed with a frame $a$, supported by legs or standards $b$, and is provided with guides $c$, on which slides the carriage $d$. Projecting forwardly from the carriage are two arms or brackets $e$, in the lower ends of which a saw $f$ is mounted on a shaft $g$, the saw rotating between the two arms. It is driven by a gear-wheel $h$, intermeshing with its teeth, said wheel $h$ being mounted upon a shaft $i$, journaled in bearings $j$ on the carriage. The shaft $i$ receives its power from the gear-wheel $k$, to which the wheel $h$ is secured by screws or bolts $l$, and a pinion (not shown) which is mounted on a cross-shaft, (also not shown,) to which is secured the bevel-wheel $m$.

The shaft of the wheel $m$ is suitably journaled in bearings on the carriage, and the said bevel-wheel intermeshes with a similar bevel-wheel $n$, engaged with a longitudinal shaft $o$ on the frame, so as to turn therewith but free to slide longitudinally thereon. The said shaft $o$ is equipped with belt-wheels $p\,p$, from which it receives its power through belts driven by any suitable motor.

The bevel-wheel $n$ is held in engagement with the bevel-wheel $m$ by a hood or bracket $q$, secured to the carriage. On the side of the frame opposite the shaft $o$ is a grooved shaft $r$, having a bevel-wheel $s$ turning therewith but sliding thereon and connected to the carriage by a bracket $t$, so as to move therewith. The shaft $i$ is equipped with a small bevel-wheel $u$, intermeshing with a larger bevel-wheel $v$, mounted on the end of an inclined shaft $w$, journaled in bearings on the carriage, which shaft $w$ is provided with a bevel-wheel $x$, intermeshing with the bevel-wheel $s$, in feathered engagement with the grooved shaft $r$.

Below the shaft $r$ and parallel therewith is a screw-shaft $y$, connected to the said shaft $r$ by gear-wheels $z$ and $a'$. Now it will be seen that when power is applied to the belt-wheels $p\,p$ the shaft $o$ will be rotated, and through the medium of the intermediate gearing the saw $f$ and the screw-shaft $y$ will be likewise rotated, the latter at a reduced rate of speed.

Mounted in the bracket $t$ are the two sections $b\,b'$ of a split nut, adapted to be clamped about the screw-shaft $y$, so as to be in threaded engagement therewith. The said sections slide in guides $c'$ on the inside faces of the bracket and are provided with pins $d'$, which project through slots therein. $e'$ is a handle having a base $f'$, with eccentric cam-slots $g'$, through which the pins $d'$ project and which is mounted upon the small stud-shaft $h'$, projecting forward from the bracket and equipped on its outer end with a nut $i'$. When the handle is turned, as shown in Fig. 8, until the pins $d'$ approach the center of the disk or the inner end of the cam-slots, the sections $b'$ of the split nut are clamped in engagement with the threaded shaft $y$, and power being applied to the machine and the said shaft $y$ being rotated the nut and the carriage will be advanced slowly forward, as will be readily understood; but when the pins are forced away from the shaft $h'$ until they occupy the outer ends of the cam-slots the section $b'$ of the nut will be disengaged from the screw-shaft.

I provide means for automatically engaging the nut-sections from the screw-shaft when the saw has severed the ends of the work and when the carriage has reached the limit of its forward movement, as I shall now proceed to describe. A strong spiral spring $j'$ has one end connected to a screw $k'$ on the bracket and the other end to a hook $l'$ on the base of the handle and tends to hold the said base in position with the pins $d'$ in the ends of the cam-slots $g'$.

$m'$ is a lever pivoted by a screw $n'$ to the bracket and held toward the handle $e'$ by a spring $o'$, engaging the pin $p'$, projecting from the bracket through a slot $q'$ in the upper end of said lever. The lever is provided on its upper inner edge with a recess $r'$ to receive a pin or projection $s'$, extending out from the base of the handle, as shown in Fig. 8, to lock the nut-sections in engagement with the shaft $y$, so that if the lower end of the lever $n'$ be moved to the right its upper end will be drawn out of engagement with the pin or projection $s'$, and the spring $j'$ will partly rotate the handle, so as to free the sections of the nut from the screw-shaft. As the spring draws the base of the handle around the second projection $p^{12}$ will enter the recess $r'$ and prevent or lock the nut-sections from engaging the screw-shaft $y$.

Arranged in the path of the lever $m'$ is a bar $u'$, secured to the frame of the machine and having an adjustable end $v'$, adapted to engage the lower ends of the lever $m'$ when the carriage has reached the limit of its forward movement, so as to force the lever backward and automatically free the nut-sections from the screw-shaft. The end $v'$ of the arm is slotted to receive screws $w'$ $w'$, by means of which it is locked in place after it has been adjusted on the bar $u'$. The carriage is thus fed slowly forward, as I have described, until the saw has cut through the work, and as it would take unnecessary time to withdraw the carriage in the same way by the screw and nut I provide for its quick return. A shaft $a^5$, having a squared end to receive a tool for turning it, is mounted in the carriage and has a pinion engaging a rack on the bed, (these last two elements not being shown,) so that the carriage may be fed forward quickly (the nut-sections being locked apart) until the saw is just about to enter the work, at which time the nut-sections may be clamped around the screw-shaft to complete the forward movement of the carriage. After the automatically-acting stop mechanism has freed the nuts from engagement with the shaft to stop the carriage the saw and carriage may be quickly withdrawn by turning the shaft $a^5$ backward.

The frame of the machine is provided with a bed-plate $a^2$, on which is placed the work-holder to act as an abutment for the work as the saw is fed forward to cut it. The work-holder consists of a frame having a base $b^2$. It may be adjusted back and forth over the bed-plate and secured in position relatively to the saw after adjustment by bolts $e^2$, passing through grooves in the said plate, said grooves coacting with the bolts to guide it in its movements. The said holder has side standards $f^2$ and a top plate $g^2$, which overhangs the support $h^2$, on which the bars 2 are placed and clamped. $i^2$ is a follower placed upon the pile of bars to clamp them against the support $h^2$, being firmly pressed downward by a series of screws $k^2$ $k^2$, threaded through the top plate $g^2$.

The work-holder has a forwardly-projecting fin, web, or plate $l^2$, with which is journaled a shaft $m^2$, having a forward threaded portion $n^2$ in threaded engagement with a nut $o^2$ on a clamp, consisting of a clamping-plate $p^2$, connected by horizontal bars $q^2$ with a vertical bar $r^2$, on which the nut $o^2$ is formed. The forwardly-projecting end of the bar $m^2$ is squared to receive a tool, by means of which it may be turned to draw the clamp $p^2$ forward against the bars 2 and lock them against the standard of the work-holder. The clamp has lugs $c^2$, entering grooves or slideways $d^2$ in the web or plate and is held against the latter by bolts $b^5$, passing through and sliding in slots $c^5$ therein.

$s^2$ is a movable gage mounted upon the stud-shaft $t^2$, projecting from one of the side standards of the work-holder and held thereon by a collar $u^2$. It has its hub cut away to form shoulders $e^5$ to engage a lug projecting out from the collar $u^2$, so that it may be thrown rearward to lie in front of the ends of the bars 2 and against which the latter may be pressed to have their ends in alinement, after which it may be thrown forward out of the way of the saw, as shown in Fig. 7. In addition to these features I provide improved devices for preventing the saw $f$ from vibrating, and especially that portion of the saw which is entering the work. Referring to Figs. 3 and 4, said devices consist of a square bracket $a^3$, bolted on the upper face of the inclined bracket $e$ of the frame by bolts or screws $b^3$. Pivoted to the rear upper end of the bracket $a^3$ is an arm $c^3$, which may be thrown forward, as shown in Fig. 3, so as to have a portion resting upon a lug or ear $d^3$ of the bracket. When it is in this position, it may be secured by a tapering pin passed into the bracket. The vertical portion of the arm has two bearings $g^3$, in each of which is placed a cheek-pin $h^3$, a portion of which is threaded to engage the internal threaded bearings $g^3$. The bearings are split on the side toward the saw, and the split portions may be clamped together by screws $i^3$. The ends of the cheek-pins $h^3$ are adjusted to lie snugly against the blade of the saw by turning the milled heads $y^3$, and then the screws $i^3$ are screwed down to clamp the split portions of the bearings together and lock the cheek-pins against movement. Thus it will be seen that the saw is steadied by four supports pressing against the plate, two on either side, which supports are arranged to press against the saw near the point where it enters the work, so as to prevent it from vibrating and to cause it to make a clean cut through the work.

Instead of mounting the swinging arm upon the bracket $a^3$ I may mount it as shown in Figs. 5 and 6. In these figures the shaft $g$ for the saw passes through suitable composite sleeves $a^4$, arranged in the arms $e$. Arms $b^4$ are pivoted around the shaft $g$ and the sleeves $a^4$, each arm having a forwardly-projecting portion $c^4$ and an upwardly-extending portion $d^4$. To the forwardly-projecting portion $c^4$ is adjustably secured a vertical bar $e^4$, having in each end a cheek-pin $f^4$, passing through a split bearing similar to that described in connection with Figs. 3 and 4. The vertical bar $e^4$ may be adjusted radially along the portion $c^4$ of the arm and secured in adjustment by a screw $g^4$. A segmental guide $h^4$ projects upwardly and forwardly from the arm $e$, concentric with the axis of the saw, and through the segmental slot therein, and through the upper end of the portion $d^4$ of the arm the bolt $i^4$ passes to secure the said portion $d^4$ to the segment $h^4$. Thus it will be seen that the whole arm may be adjusted around the axis of the saw and secured at any desired adjustment.

Having thus explained the nature of the invention and described a way of constructing and using the same, though without attempting to set forth all of the forms in which it may be made or all of the modes of its use, I declare that what I claim is—

1. In a machine of the character described, the combination with the stationary work-support, and a carriage traveling toward and from said support, of lateral supports for the saw, arranged to bear against the saw at two points on each side thereof, and arms pivoted on both sides of the saw to the carriage, and each arranged to receive two of said supports.

2. In a machine of the character described, the combination with the frame, the saw and the means for rotating the saw, of a work-holder comprising a frame adapted to receive the work, clamps for clamping the work vertically, a clamp for clamping it horizontally therein and means for adjusting the work toward and from the saw.

3. In a machine of the character described, the combination with the frame, the saw, and the means for rotating the saw, of a work-holder comprising a frame adapted to receive the work, a clamp for clamping the work horizontally against the holder, a screw for operating said clamp, and screws for clamping the work vertically and means for adjusting the frame toward and from the saw.

4. In a machine of the character described, the combination with the frame, the saw, and the means for rotating the saw, of a work-holder comprising a frame adapted to receive the work, said frame having a web or fin, a screw-shaft journaled in bearings in said web or fin, and a clamp for the work having a nut through which said screw-shaft passes.

5. In a machine of the character described, the combination with the frame, the saw, and the means for rotating the saw, of a work-holder comprising a frame adapted to receive the work, said frame having a web or fin with guides, a clamp having a clamping-bar and sliding in said guides, and a screw-shaft engaging the clamp and journaled in said web or fin.

6. In a machine of the character described, the combination with the frame, the saw, and the means for rotating the saw, of a work-holder comprising a frame adapted to receive the work, clamps for securing the work in the frame, and a movable gage mounted on the work-holder and adapted to be moved in front of and out of the path of the work, said gage having a stop to hold it in either of its two positions.

7. In a machine of the character described, the combination with the frame, the saw, and the means for rotating the saw, of a work-holder comprising a frame adapted to receive the work, clamps for securing the work in the frame, a shaft projecting from the work-holder, a gage adjustable along the shaft, and stops for said gage to hold it in either its operative or its non-operative positions.

8. In a machine of the character described, the combination with the frame, the carriage, a saw mounted on the carriage, and a feed-screw mounted on the frame, of a split nut traveling with the carriage, a disk having cam-slots to engage or disengage the sections of the nut with or from the screw, a spring for holding the disk in position to hold the sections apart, and a lock for holding the sections together in engagement with the screw and also for holding them apart.

In testimony whereof I have signed my name to this specification, in the presence of two subscribing witnesses, this 2d day of October, A. D. 1896.

ADELBERT P. HANSCOM.

Witnesses:
A. D. HARRISON,
P. W. PEZZETTI.